United States Patent
Hassani et al.

(10) Patent No.: US 12,206,992 B2
(45) Date of Patent: Jan. 21, 2025

(54) IMAGE CAPTURE WITH VARIED ILLUMINATIONS

(71) Applicant: Ford Global Technologies, LLC, Dearborn, MI (US)

(72) Inventors: Ali Hassani, Ann Arbor, MI (US); Alexandra Taylor, Harbor Springs, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 17/823,133

(22) Filed: Aug. 30, 2022

(65) Prior Publication Data

US 2024/0073538 A1     Feb. 29, 2024

(51) Int. Cl.
| | | |
|---|---|---|
| *H04N 23/72* | (2023.01) | |
| *H04N 23/56* | (2023.01) | |
| *H04N 23/71* | (2023.01) | |
| *H04N 23/741* | (2023.01) | |

(52) U.S. Cl.
CPC ............ *H04N 23/72* (2023.01); *H04N 23/56* (2023.01); *H04N 23/71* (2023.01); *H04N 23/741* (2023.01)

(58) Field of Classification Search
None
See application file for complete search history.

(56) References Cited

U.S. PATENT DOCUMENTS

| | | | |
|---|---|---|---|
| 7,379,100 B2 * | 5/2008 | Gokturk | G01S 17/89 348/229.1 |
| 10,009,554 B1 | 6/2018 | Miao et al. | |
| 10,447,942 B1 * | 10/2019 | Shaick | G06T 5/50 |
| 11,470,270 B1 * | 10/2022 | Powell | G06T 3/4007 |
| 2010/0019151 A1 | 1/2010 | Shimizu | |
| 2011/0242334 A1 | 10/2011 | Wilburn et al. | |
| 2021/0064030 A1 * | 3/2021 | Jiang | B60W 60/001 |

FOREIGN PATENT DOCUMENTS

WO    WO-2021037934 A1 *   3/2021  ............. G01J 3/505

OTHER PUBLICATIONS

"Smart Vehicle Headlight Auto Switching and Intensity Control Electronics Projects, Hardware Projects", Copyright © 2022 Nevon Projects.

* cited by examiner

*Primary Examiner* — James M Hannett
(74) *Attorney, Agent, or Firm* — Frank Lollo; Brooks Koshman P.C.

(57) ABSTRACT

A first frame of image data is captured at a first illumination intensity during a first time segment. A second frame of image data is captured at a second illumination intensity during a second time segment. The first frame and the second frame are combined and outputted as a compensated frame.

19 Claims, 4 Drawing Sheets

IMAGE CAPTURE WITH VARIED ILLUMINATIONS

BACKGROUND

Vehicles have cameras for capturing image data to be used by vehicle subsystems. The cameras can utilize light sources to provide illumination for capturing image data. Different cameras can utilize different levels of illumination. Some vehicle subsystems may utilize frames of image data with minimal illumination while some subsystems in a same vehicle may utilize frames of image data with more than no or minimal levels of illumination.

DETAILED DESCRIPTION

Introduction

The present disclosure provides for outputting image data that is a combination of illuminated frames 124 and dark frames 126 captured by a camera 116 to output a compensated frame. In one implementation, a camera 116 can capture a first frame of image data at a first illumination intensity during a first time segment 128. The camera 116 can then capture a second frame at a second illumination intensity during a second time segment 130 after the first time segment 128. The camera 116 can then send the image frames to a computer 104 and the computer 104 may combine the first frame and the second frame to output a compensated frame.

The compensated frame can be provided as image data and could be implemented in a variety of applications or environments that rely on camera sensors 106, and may be useful in environments featuring multiple illumination sources that can be active at various times, and/or multiple cameras 116 that capture images based on detecting light at various times and/or at different wavelengths. For example, the image data can be provided to vehicle subsystems that actuate vehicle components 108.

Accordingly, included in the present disclosure is a system comprising a computer that includes a processor and e memory, the memory stores instructions executable by the processor including instructions to capture a first frame of image data at a first illumination intensity during a first time segment; capture a second frame at a second illumination intensity during a second time segment after the first time segment; and combine the first frame and the second frame to output a compensated frame.

An amount of ambient light can be estimated by dividing the first time segment by the second time segment and multiplying by the second illumination intensity.

The compensated frame can be provided as image data for a driver-state monitoring system in a vehicle.

The first illumination intensity can be decreased and a third frame captured during the first time segment.

The third frame and the second frame may be combined and outputted as a compensated frame.

The third frame may be captured based on an illumination intensity threshold.

The first illumination intensity may be decreased based on a prior calibration of an illumination intensity threshold.

The second illumination intensity may be no illumination.

It may be determined whether there is contrast in the compensated frame based on an illumination intensity threshold.

The length of the first time segment or the second time segment may be adjusted based on a determination that there is not contrast in the compensated frame.

The first time segment and the second time segment may be calibrated prior to the capture of the first image to provide contrast in the compensated frame.

The first time segment may be no more than 25 milliseconds.

The second time segment may be no more than 8 milliseconds.

A method comprises capturing a first fame of image data at a first illumination intensity during a first time segment; capturing a second frame at a second illumination intensity during a second time segment after the first time segment; and combining the first frame and the second frame to output a compensated frame.

An amount of ambient light can be estimated by dividing the first time segment by the second time segment and multiplying by the second illumination intensity.

The first illumination intensity can be decreased and a third frame captured during the first time segment.

The third frame and the second frame may be combined and outputted as a compensated frame.

The second illumination intensity may be no illumination.

The first time segment and the second time segment may be calibrated prior to the capture of the first image to provide contrast in the compensated frame.

System Elements

Figure 1:
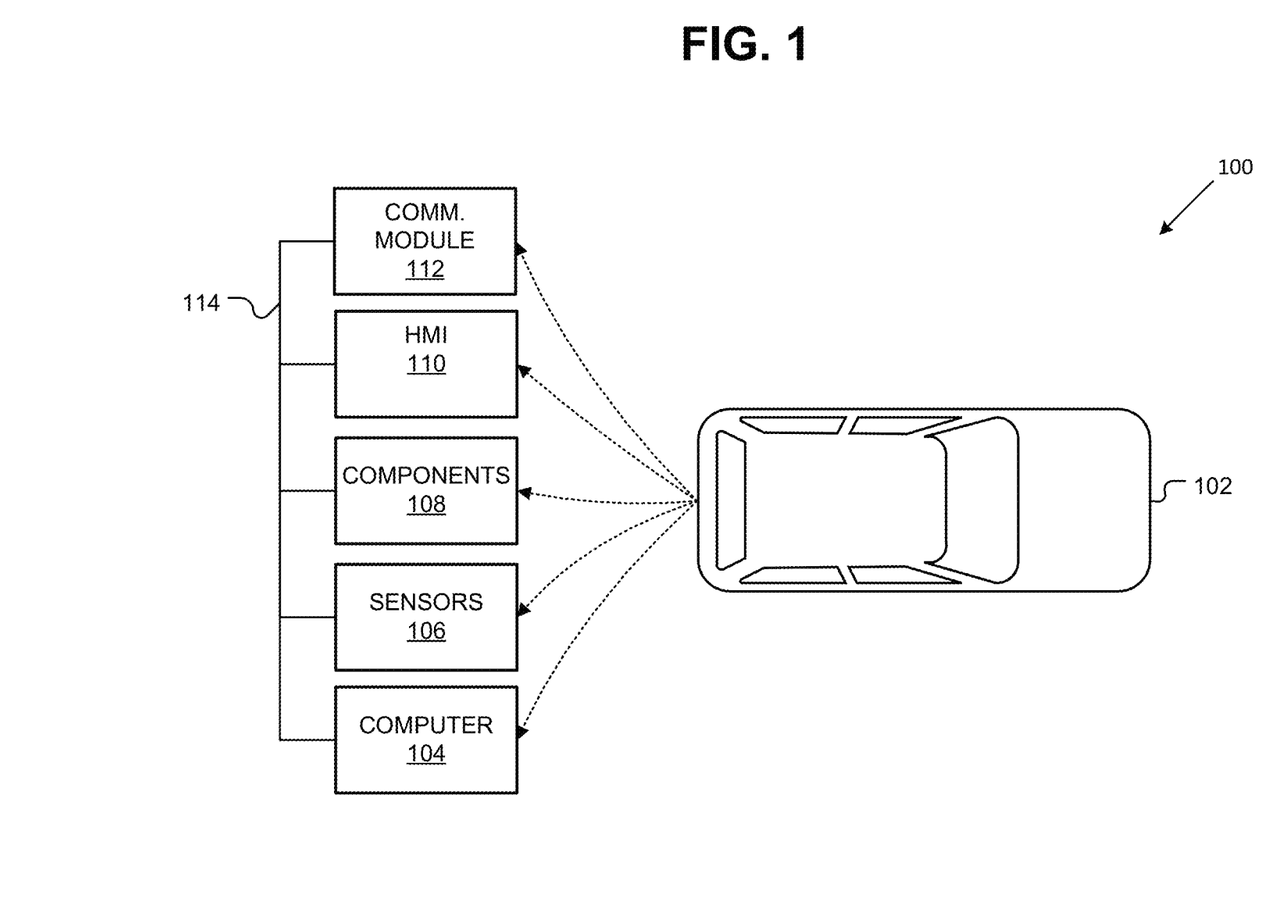
FIG. 1 is a block diagram of an example vehicle system.

FIG. 1 is a block diagram of a vehicle system 100 for obtaining digital images. The vehicle 102 includes a computer 104 having a memory that includes instructions executable by the computer 104 to carry out processes and operations including as described herein. The computer 104 may be communicatively coupled via a communication network, such as a vehicle network 114, with sensors 106, components 108, a human machine interface (HMI) 110 and a communication module 112 in the vehicle 102. The vehicle 102 may be any passenger or commercial automobile such as a car, a truck, a sport utility vehicle, a crossover, a van, a minivan, a taxi, a bus, etc.

The vehicle computer 104 includes a processor and a memory. The memory includes one or more forms of computer readable media, and stores instructions executable by the vehicle computer 104 for performing various operations, including as disclosed herein. For example, a vehicle computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 108 inside an FPGA may be configured based on VHDL programming, e.g., stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers, or any volatile or non-volatile media. The memory can store the collected data sent from the sensors 106. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 114 such as a communications bus as described further below, more than one processor, e.g., included in components 108 such as sensors 106, electronic control units (ECUs) or the like included in the vehicle 102 for monitoring and/or controlling various vehicle components 108, e.g., a powertrain controller, a brake controller, a steering controller, etc. The computer 104 is generally arranged for communications on a vehicle communication network that can include a bus in the vehicle 102 such as a controller area network CAN or the like, and/or other wired and/or wireless mechanisms. Alternatively or additionally, in cases where the computer 104 actually comprises a plurality of devices, the vehicle communication network may be used for communications between devices represented as the computer 104 in this disclosure. Further, as mentioned below, various controllers and/or sensors 106 may provide data to the computer 104 via the vehicle communication network.

The vehicle 102 typically includes a variety of sensors 106. A sensor 106 is a device that can obtain one or more measurements of one or more physical phenomena. Some sensors detect internal states of the vehicle 102, for example, wheel speed, wheel orientation, and engine and transmission variables. Some sensors detect the position or orientation of the vehicle 102, for example, global positioning system GPS sensors. Some sensors detect objects, for example, radar sensors, scanning laser range finders, light detection and ranging LIDAR devices, and image processing sensors such as cameras 116.

The sensors 106 can be cameras 116 and can detect electromagnetic radiation in some range of wavelengths. For example, the sensors 106 may detect visible light, infrared radiation, ultraviolet light, or some range of wavelengths including visible, infrared, and/or ultraviolet light. For example, the camera 116 can be a charge-coupled device CCD, complementary metal oxide semiconductor CMOS, or any other suitable type. The cameras 116 include a modulated light source 118 for illuminating the environment so that the cameras 116 may detect both reflected light from the modulated light source 118 and ambient light. A camera 116 captures an image of an area in a field of view 122 of the camera 116. When capturing an image of an area in the field of view 122 of the camera 116, the camera 116 exposes a camera lens to the area until an image is captured. The camera 116 may continuously expose its lens to the are so that multiple images of the area may be captured.

The light source 118 can produce illumination in some range of wavelengths specifically, illumination detectable by the cameras 116. For example, the light source 118 may produce visible light, infrared radiation, ultraviolet light, or some range of wavelengths including visible, infrared, and/or ultraviolet light. The light source 118 can be configured to produce illumination in a range of wavelengths completely or significantly encompassed by the range of wavelengths detectable by the cameras 116. For example, the light sources 118 can produce and the cameras 116 can detect illumination outside a visible range, e.g., infrared illumination, e.g., near-infrared illumination (700-1300 nanometers (nm)). The light source 118 can be any suitable type for producing the desired wavelengths, e.g., for visible light, tungsten, halogen, high-intensity discharge (HID) such as xenon, light-emitting diodes (LED), etc.; for infrared light, LEDs, lasers, filtered incandescent, etc.

The vehicle 102 defines a passenger compartment 120 to house occupants, if any, of the vehicle 102. The passenger compartment 120 may extend across the vehicle 102, i.e., from one side to the other side of the vehicle 102. The passenger compartment 120 includes a front end and a rear end with the front end being in front of the rear end during forward movement of the vehicle 102. The light source 118 can produce illumination detectable by the cameras 116 on an area in the passenger compartment 120.

The cameras 116 are typically arranged in positions to detect occupants housed in the passenger compartment 120 of the vehicle 102. For example, the cameras 116 can have a field of view 122 encompassing a seat of a vehicle operator. The camera 116 can be mounted on or above a rear view mirror, an instrument panel, etc.

The light sources 118 are arranged to produce illumination detectable by the cameras 116, and likewise the cameras 116 are arranged to detect illumination from the light sources 118. Specifically, the light sources 118 are arranged to illuminate areas in the fields of view of the cameras 116, and the cameras 116 are arranged so that the fields of view of the cameras 116 encompass areas illuminated by the light sources 118. The cameras 116 thereby receive illumination from the light sources 118 that has reflected off of features of the environment. For example, the light sources 118 can each be mounted to a respective one of the cameras 116 and aimed in the same direction as that camera 116. The respective pairings of light sources 118 and cameras 116 can be packaged as a single unit.

Exemplary System Operations

Figure 2:
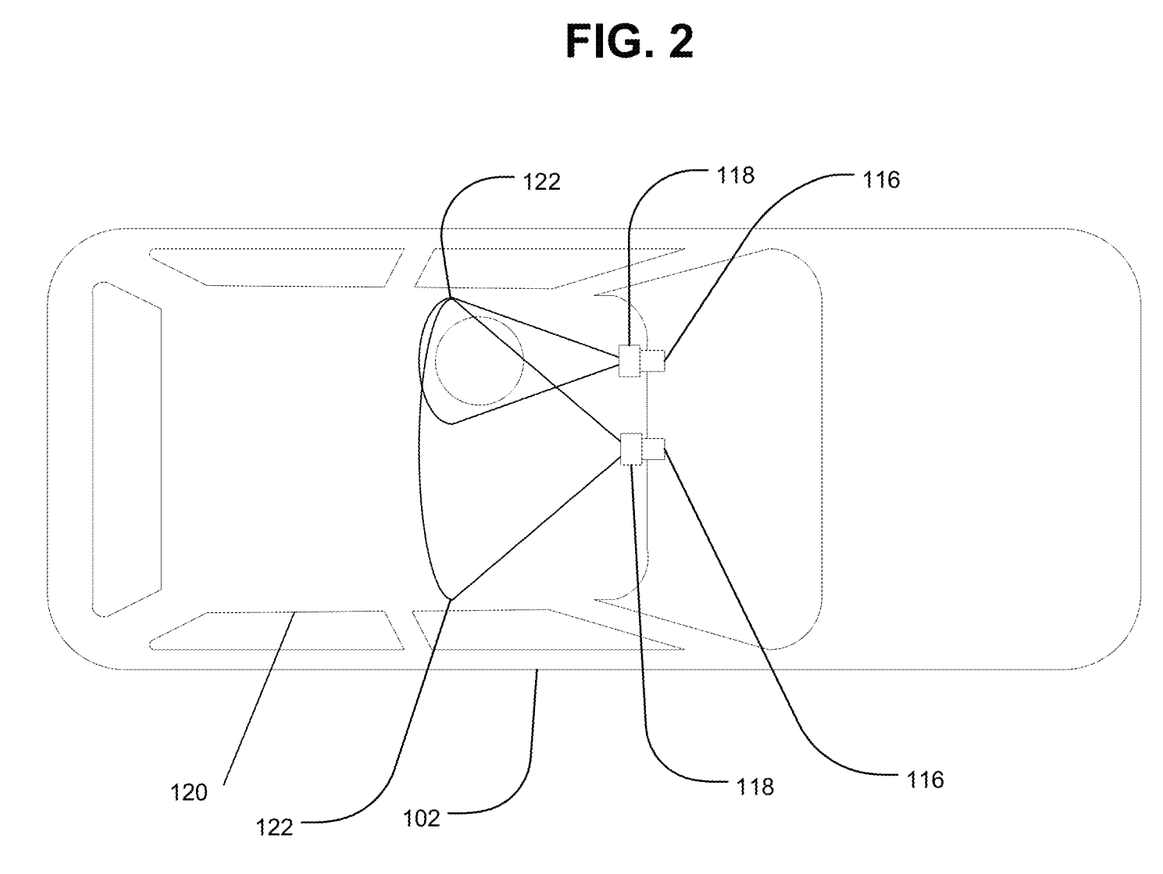
FIG. 2 illustrates an example vehicle camera light source layout.

FIG. 2 shows an example camera 116 field of view 122 in the passenger compartment 120. The cameras 116 generate image data representing the respective fields of view of the cameras 116. The image data from a camera 116 typically include a sequence of image frames of a fields of view of the camera 116, respective frames being captured at respective times. Each image frame is a two dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view 122 of the camera 116 at the time that the image frame was recorded, can be specified in pixel dimensions or coordinates, e.g., an ordered pair of pixel distances, such as a number of pixels from a top edge and a number of pixels from a left edge of the field of view 122.

Cameras 116 may utilize image contrast to produce image frames. Image contrast refers to the measurement of different luminance levels between the brightest color "white" and the darkest color "black" in an image. Contrast is calculated by dividing a relative luminance of a lighter color by a relative luminance of a darker color. The result is a ratio ranging from 1:1 which is the existence of no contrast, to 21:1, which is the highest color contrast possible based on the equation described below. A relative luminance of a color is measured by normalizing the relative brightness of a point in the color to 0 for the darkest value and 1 for the lightest value. For example, relative luminance could be determined as follows.

$$\text{Relative Luminance} = 0.2126 * R^{2.2} + 0.7152 * G^{2.2} + 0.0722 * B^{2.2}$$

Where R, G, and B are:
if $R_{sRGB} \leq 0.04045$ then $R = R_{sRGB}/12.92$ else $R = ((R_{sRGB} + 0.055)/1.055)^{2.4}$
if $G_{sRGB} \leq 0.04045$ then $G = G_{sRGB}/12.92$ else $G = ((G_{sRGB} + 0.055)/1.055)^{2.4}$
if $B_{sRGB} \leq 0.04045$ then $B = B_{sRGB}/12.92$ else $B = ((B_{sRGB} + 0.055)/1.055)^{2.4}$
And $R_{sRGB}$, $G_{sRGB}$, and $B_{sRGB}$ are defined as:
$R_{sRGB} = R_{8bit}/255$
$G_{sRGB} = G_{8bit}/255$
$B_{sRGB} = B_{8bit}/255$
With $R_{8bit}$, $G_{8bit}$, $B_{8bit}$ being a value between 0 and 255

An adjustment in the image contrast of a frame of image data captured by the cameras 116 may improve the readability of the image data for vehicle subsystems that utilize image data. Vehicle subsystems may utilize frames of image data having high contrast and thus the light source 118 may be actuated to provide greater illumination of the field of view 122. Vehicle subsystems that utilize frames of image data having a high contrast are herein referred to as light systems and frames of image data that utilize contrast are herein referred to as illuminated frames 124.

Vehicle subsystems, such as a driver state monitoring, gaze detection, image authentication, etc. may utilize dark frames 126 of image data. The dark frames 126 of image data may be used by the vehicle 102 to determine eye-glint, facial-identification, etc. Dark frames 126 refer to frames of image data that are generated by the camera 116 when the light source 118 of the camera 116 is not actuated, i.e., the light source 118 is not providing illumination. To generate a dark frame 126 of image data, the vehicle computer 104 actuates the camera 116 to capture a frame of image data without actuating the light source 118 for the camera 116. Ambient light may still be captured in the dark frame 126 by the camera 116. Vehicle subsystems that utilize dark frames 126 of image data are herein referred to as dark systems, and frames of image data that are generated when the light source 118 is not actuated are herein referred to as dark frames 126.

A vehicle 102 may actuate dark systems and light systems during a same time period. That is, dark systems and light systems may be actuated for lengths of time that are at least partially overlapping but not necessarily simultaneous or completely overlapping. As described above, in order to capture a dark frame 126, the light source 118 is not actuated such that it provides no illumination. And in order to capture an illuminated frame 124 or a semi-illuminated frame the light source 118 is actuated such that is provides at least some illumination. Because dark frames 126 utilize no illumination and illuminated frames 124 and semi-illuminated frames utilize at least some illumination, dark systems and light systems utilize different illumination. "Different illumination" herein means a difference in illumination between a dark system utilizing no illumination provided by the light source 118 in order to capture a dark frame 126, and a light system utilizing at least some illumination provided by the light source 118 in order to capture an illuminated frame 124 or semi-illuminated frame.

The computer 104 can receive frames of image data from the cameras 116 at a calibrated framerate, i.e., a number of frames per second. The image data is then fed to vehicle subsystems that make determinations based on the image data. A higher framerate allows for more image data to be fed by the computer 104 to the vehicle subsystems that utilize image data in a given amount of time. A framerate FR can be determined using the equation below:

$$FR = F/T$$

In the above equation, F is a number of generated frames of image data and T is an amount of time, e.g., in seconds, during which the F frames were generated. In an example, a camera 116 may generate 30 frames of image data in a 1 second period. Using the equation provided, the framerate of the camera 116 is 30 frames per second. In a 30 frame per second system, each frame lasts for 1/30 of 1 second (33⅓ milliseconds). Therefore, a camera 116 that generates frames of image data at a framerate of 30 frames per second generates one frame every 33⅓ milliseconds for 1 full second.

A camera 116 may be shared by some vehicle subsystems that may utilize frames of image data with high contrast and other vehicle subsystems that may utilize dark frames 126 of image data, i.e., a camera 116 may be shared by one or more light systems and dark systems. The computer 104 may, in response to both a light system and a dark system using one camera 116 in a same time period, actuate the camera 116 to capture a first frame of image data at a first illumination intensity during a first time segment 128, capture a second frame of image data at a second illumination intensity during a second time segment 130 after the first time segment 128, and combine the first frame and the second frame to output a compensated frame. The compensated frame can then be used by the light system and the dark system as image data.

It will be understood that the usage of the terms "first", "second", "third" are merely identifying and not necessarily indicative of priority.

Figure 3:
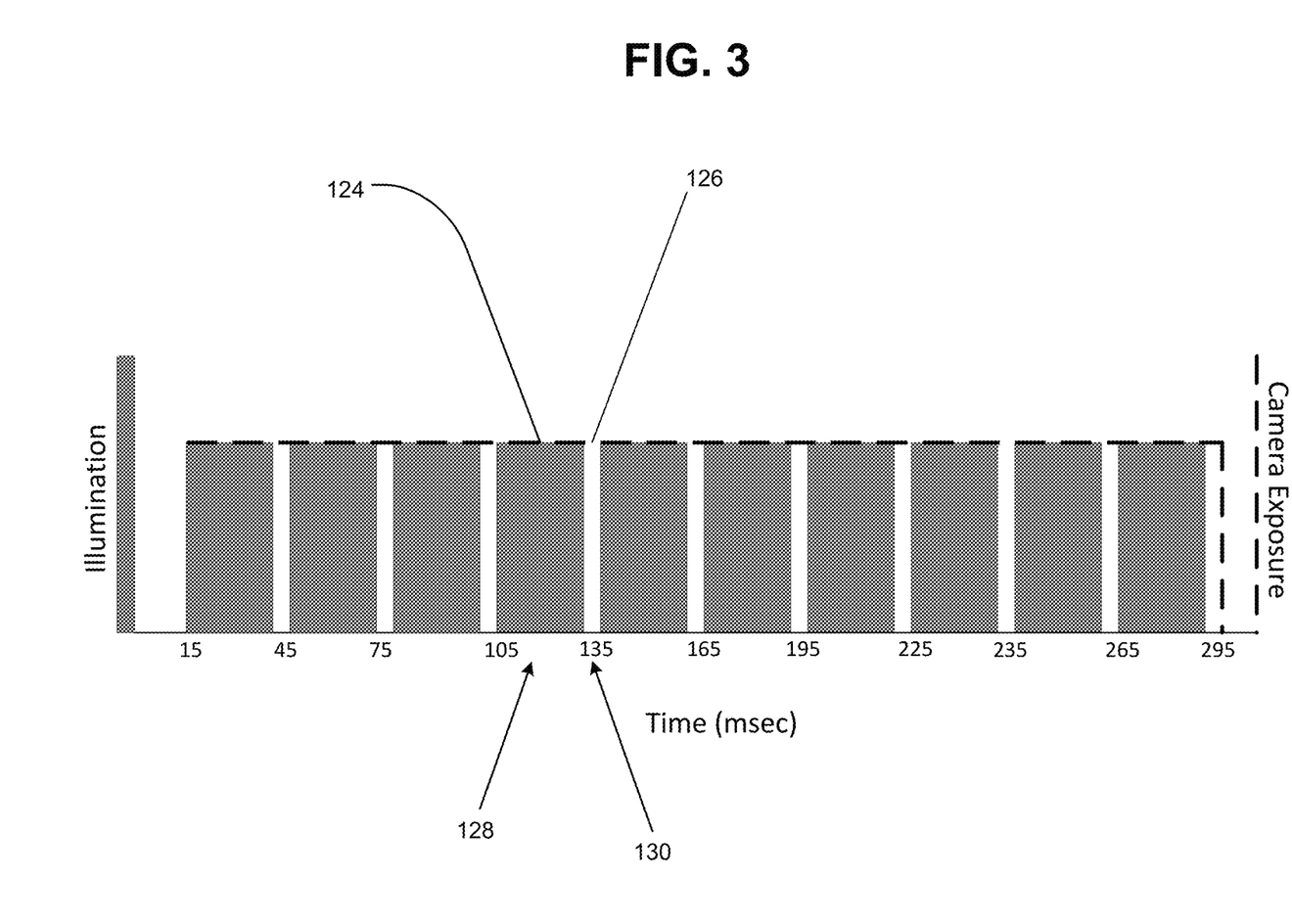
FIG. 3 is a diagram illustrating the timing of capturing dark frames and illuminated frames.

FIG. 3 illustrates how a camera 116 and light source 118 may be actuated to capture illuminated frames 124 and dark frames 126 in the time utilized for a single compensated frame. A first time segment 128 and a second time segment 130 may be selected as a function of desired illumination and/or a frame-rate utilized to acquire camera data. As an example, the first time segment 128 may be no longer than 25 milliseconds, and the second time segment 130 may be no longer than 8 milliseconds so that the overall duration for capturing the frame is no longer than 33 milliseconds. The first illumination intensity may be the illumination intensity when the light source 118 is fully actuated and the second illumination intensity may be the illumination intensity when the light source 118 is not actuated. In other words, the second illumination intensity may be 0 (zero) illumination intensity being provided by the light source 118. That is, the first frame of image data may be an illuminated frame 124 and the second frame of image data may be a dark frame 126.

The computer 104 may estimate an amount of ambient light in the passenger cabin in the illuminated frame 124 based on the dark frame 126 of image data. In other words, the computer 104 may determine the ambient light in the passenger cabin based on the difference between the image data of the area in the field of view 122 of the camera 116 when the area is both illuminated by the camera's light source 118 and not illuminated. according to the Ambient light $I_{ambient}$ may be determined according to the below equation:

$$I_{ambient} = I_{dark} \times (t_{illum}/t_{dark})$$

Where $I_{ambient}$ is the ambient light in the passenger cabin, $I_{dark}$ is the illumination intensity in the dark frame 126, $t_{illum}$ is the first time segment 128, and $t_{dark}$ is the second time segment 130.

As mentioned above, the compensated frame may be used as image data for both light systems and dark systems. As examples, the compensated frame may be used as image data for a dark system in a vehicle 102 such as a driver-state-monitoring system, an image authentication system, or an image authentication application.

The computer 104 may actuate the light source 118 to a selected amount of illumination, e.g., may decrease the light output of the light source 118 such that the light source 118 is outputting less illumination than its full capability but more than no illumination. The camera 116 may then capture a third frame of the area. The frame of image data captured when the light source 118 is selectively illuminating the area is herein referred to as a semi-illuminated frame. The semi-illuminated frame may be captured by the camera 116 during the first time segment 128 instead of the illuminated frame 124. The semi-illuminated frame may then be combined with the dark frame 126 and outputted as a compensated frame. The semi-illuminated frame may be used instead of the illuminated frame 124 where vehicle subsystems utilize frames of image data with a lower level of contrast than would be provided by the illuminated frame 124.

The computer 104 may actuate the light source 118 to a selected amount of illumination (i.e., more than zero illumination and less than a full illumination capability of a light source 118) based on an illumination intensity threshold. The illumination intensity threshold may be an empirically determined measurement of illumination intensity that is within a range of illumination intensity of which the light source 118 is capable of outputting. The illumination intensity threshold may be determined to suit the specifications of a light system that utilizes frames of image data with a lower contrast than would be provided if the light source 118 were actuated to be fully illuminating. As an example, if a light system utilizes a lower contrast and therefore a lower illumination intensity in the passenger cabin, the computer 104 may determine if the utilized illumination intensity is below the illumination intensity threshold. If the utilized illumination intensity is below the illumination intensity threshold, the computer 104 may actuate the light source 118 to illuminate the area at an intensity less than its maximum intensity. The illumination intensity threshold may be set based on a prior calibration of the computer 104. The prior calibration may be based on an empirical determination as mentioned above.

Prior calibration herein refers to a feature of the method or systems such as a value threshold being determined and programmed into the computer 104 prior to the method beginning such that the feature may be relied upon for by the method during operation as described herein.

Empirically determining an illumination intensity threshold can be performed by operating a vehicle in a test environment (e.g., on a test track) or on roadway, and observing the operation of vehicle light and dark systems in response to changing illumination intensity thresholds. The observations can then be used to determine an illumination intensity threshold.

The computer 104 may further determine whether there is contrast in the compensated frame based on the illumination intensity threshold. I.e. the computer 104 may determine whether the contrast level in the compensated frame is sufficient for the operation of a vehicle subsystem. As an example, if the contrast is below a contrast threshold, the vehicle 102 may make a determination that the compensated frame does not have contrast. The contrast threshold may be an empirically determined measurement of contrast that is utilized in image data for operation of a vehicle subsystem. The contrast threshold may be determined to suit the specifications of a light and/or dark system that utilizes frames of image data with a specific contrast. Accordingly, the computer 104 may determine that the illumination output of the light source 118 is too low to provide a utilized contrast in the frame of image data and, in response, actuate the light source 118 to output a higher illumination output. As mentioned above, the illumination intensity threshold may be empirically determined and pre-calibrated.

The computer 104 may further adjust the length of the first time segment 128 or the second time segment 130 based on a determination that there is not contrast in the compensated frame. Specifically, the computer 104 may increase or decrease the first time segment 128 from a base time of 25 milliseconds and may increase or decrease the second time segment 130 from a base time of 8 milliseconds. As an example, the computer 104 may adjust the lengths of the first or the second times if the computer 104 determines that the first time segment 128 is not long enough for the compensated frame to have contrast.

The first time segment 128 and the second time segment 130 may further be calibrated prior to capturing the first image to provide contrast in the compensated frame. Likewise, the first illumination intensity and the second illumination intensity may be calibrated prior to capturing the first image to provide contrast in the compensated frame. The calibration may be made based on data gathered during testing as described above. Specifically, a vehicle may be run in test conditions and the time segments and illumination intensities adjusted until a set of time segments and illumination intensities are found that provide contrast in the compensated frame.

Example Processes

Figure 4:
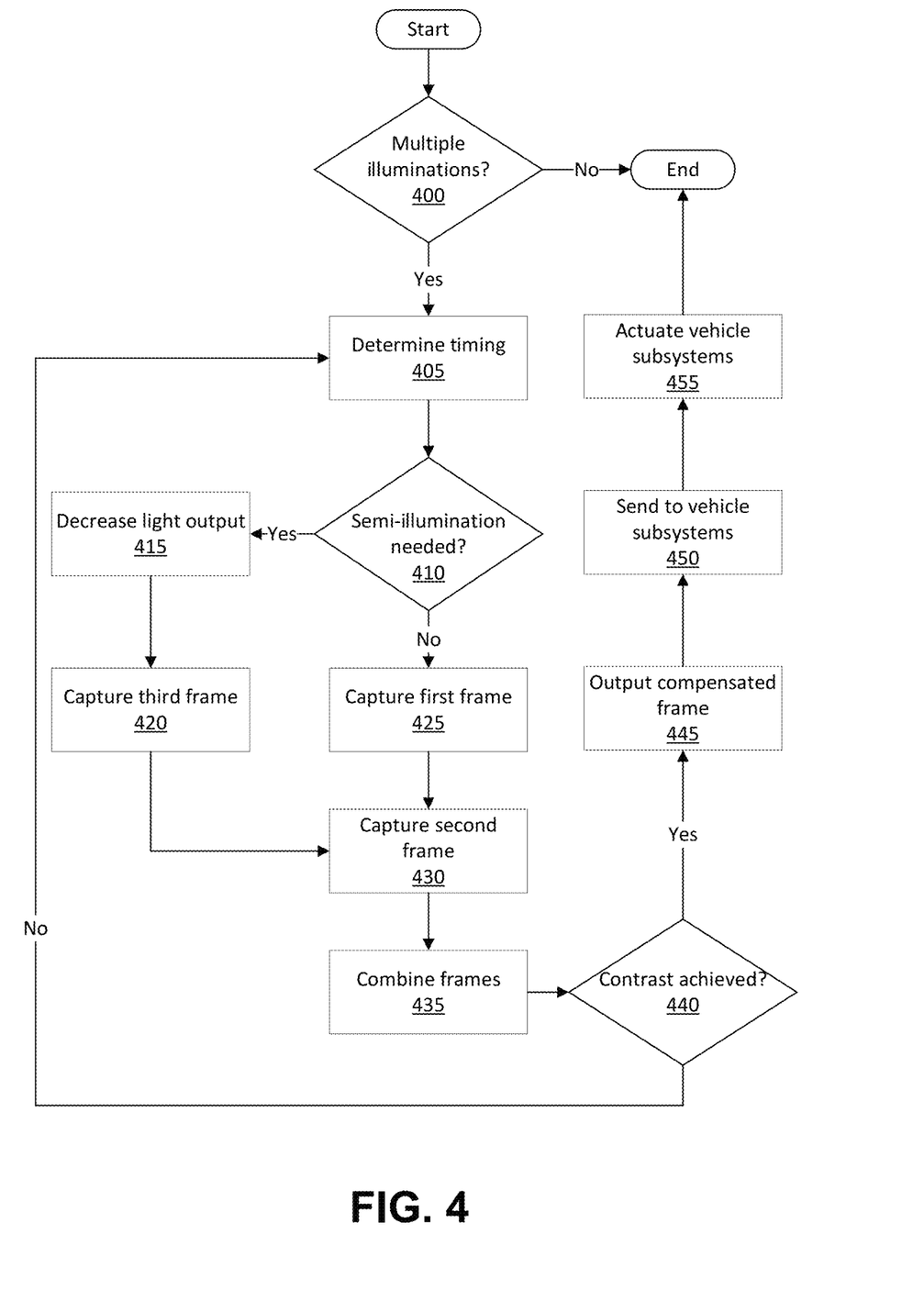
FIG. 4 is a process flow diagram of an example process for outputting image data that combines illuminated frames and dark frames.

FIG. 4 is a process flow diagram of an example process for outputting image data that is a combination of illuminated frames 124 and dark frames 126 captured by a camera 116 to output a compensated frame. The process can be carried out according to a program instructions executed in the computer 104. The process begins in a decision block 400 in which the vehicle 102 determines whether multiple vehicle subsystems are operating that utilize frames of image data having different illuminations, e.g., a first subsystem may utilize dark frames 126 while a second subsystem may utilize illuminated frames 124 and/or or semi-illuminated frames as described above. Vehicle subsystems that may utilize frames of image data having different illuminations can include driver state monitoring, gaze detection, image authentication, etc. Driver state monitoring may utilize dark frames 126 of image data and gaze detection and image authentication may utilize illuminated frames 124 or semi-illuminated frames of image data. If the computer 104 does not detect multiple subsystems operating that utilize frames of image data having different illuminations, the process ends. Otherwise the process continues.

Next, in a block 405, the computer 104 determines respective lengths of the first time segment 128 and the second time segment 130. The first time segment 128 is the amount of time to capture an illuminated frame 124 or semi-illuminated frame as the first frame and the second time segment 130 is the amount of time to capture a dark frame 126 as the second frame. The first time segment 128 and the second time segment 130 may be determined to provide contrast based on a prior calibration of the computer 104, as explained above. As an example, the first frame and the second frame may be combined and outputted in a future block as a single frame in a system that operates at 30 frames per second. Because the frames will be combined and outputted as a single frame in a 30 frames per second system, the addition of the first time segment 128 and the second time segment 130 may be no greater than 1 divided by 30 seconds or 33⅓ milliseconds. As a further example the first time segment 128 may be no greater than 25 milliseconds and the second time segment 130 may be no greater than 8 milliseconds.

Next, in a block 410, the computer 104 determines whether one of the vehicle subsystems detected to be operating in the block 400 above utilizes a semi-illuminated frame. As mentioned above, the computer 104 may actuate the light source 118 to a selected amount of illumination, e.g., may decrease the light output of the light source 118 such that the light source 118 is outputting less illumination than its full capability but more than no illumination to provide a semi-illuminated frame. If a vehicle subsystem utilizes a semi-illuminated frame of image data, the process proceeds to block 415. If no vehicle subsystem utilizes a semi-illuminated frame of image data, then the process proceeds to block 425.

If the computer 104 determines that a vehicle subsystem utilizes a semi-illuminated frame, the process continues to block 415. In block 415, the computer 104 actuates the light source 118 to decrease its light output to a luminance utilized by the vehicle subsystem. The degree to which the light output of the light source 118 is decreased is pre-calibrated for each vehicle subsystem that utilizes semi-illuminated frames, e.g. as described above.

Next, in a block 420, the computer 104 actuates the camera 116 to capture the third frame of image data as described above. The block then proceeds to a block 430.

If the computer 104 determined that no operating vehicle subsystems utilize semi-illuminated frames of image data, the process continues to block 425. In block 425, the computer 104 actuates the camera 116 to capture the first frame of image data as mentioned above.

Next, in block 430, the computer 104 actuates the camera 116 to capture the second frame of image data. The second frame of image data may be a frame of image data captured when the light source 118 is not actuated as mentioned above. The second frame is captured following the capture of the first frame or the second frame.

Next, in a block 435, the computer 104 combines the second frame of image data with either the first frame of image data or the third frame of image data. The two frames are combined such that they may be provided to a vehicle subsystem as a single frame, herein referred to as a compensated frame. As an example, the compensated frame may be one frame in a 30 frame per second system. I.e. the compensated frame may have a duration of 33⅓ milliseconds. As an example, the second frame of image data may be combined with either the first frame of image data or the third frame of image data by the computer 104 averaging the frames. That is, the computer 104 may measure the luminance in each pixel in each of the frames and average them together to create the compensated frame.

Next, in a block 440, the computer 104 determines whether there is contrast in the compensated frame based on the illumination intensity threshold. That is, the computer 104 may determine whether the contrast level in the compensated frame is sufficient for the operation of a vehicle subsystem. As an example, if the contrast is below a contrast threshold, the vehicle 102 may make a determination that the compensated frame does not have contrast and return to block 405. The contrast threshold may be an empirically determined measurement of contrast that is utilized in image data for operation of a vehicle subsystem. The contrast threshold may be determined to suit the specifications of a light and/or dark subsystem that utilizes frames of image data with a specific contrast. Accordingly, the computer 104 may determine that the illumination output of the light source 118 is too low to provide a utilized contrast in the frame of image data and, in response, the process may return to block 405 to adjust at least one of the first time segment 128 or the second time segment 130. If the computer 104 determines that there is contrast in the compensated frame, the process continues to block 445.

Next, in block 445, the computer 104 outputs the compensated frame. That is, the computer 104 combines the second frame of image data with one of the second frame or the third frame to be used as image data by the vehicle subsystems. As mentioned above, the compensated frame may be a single frame in a 30 frame per second system.

Next, in a block 450, the computer 104 sends the compensated frame as image data to the vehicle subsystems.

Next, in a block 455, the vehicle subsystems are actuated based off the compensated frame of image data. As an example, the image data may be used in a driver state monitoring subsystem which utilizes dark frames 126 of image data. As another example, the image data may be used in a face recognition subsystem which utilizes illuminated frames 124 of image data. In both examples, the compensated frame of image data may be utilized by the subsystem because it combines illuminated frames 124 and dark frames 126. The process then ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. in general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 104. Common forms of computer-readable media include, for example, RAM, a PROM, an EPROM, a FLASH-EEPROM, any other memory chip or cartridge, or any other medium from which a computer 104 can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the Figures should not be viewed as limiting. It should be understood that other embodiments might include more or less of each element shown in a given Figure. Additionally, some of the illustrated elements may be combined or omitted. Yet further, an example embodiment may include elements that are not illustrated in the Figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising a computer that includes a processor and a memory, the memory storing instructions executable by the processor including instructions to:
   capture a first frame of image data at a first illumination intensity during a first time segment;
   capture a second frame at a second illumination intensity during a second time segment after the first time segment;
   combine the first frame and the second frame to output a compensated frame; and
   estimate an amount of ambient light by dividing the first time segment by the second time segment and multiplying by the second illumination intensity.

2. The system of claim 1, wherein the instructions further include instructions to provide the compensated frame as image data for a driver-state-monitoring system in a vehicle.

3. The system of claim 1, wherein the instructions further include instructions to decrease the first illumination intensity and then capture a third frame during the first time segment.

4. The system of claim 3, wherein the instructions further include instructions to combine and output the third frame and the second frame as a compensated frame.

5. The system of claim 3, wherein the instructions further include instructions to capture a third frame based on an illumination intensity threshold.

6. The system of claim 3, wherein the instructions further include instructions to decrease the first illumination intensity based on a prior calibration of an illumination intensity threshold.

7. The system of claim 1, wherein the second illumination intensity is no illumination.

8. The system of claim 1, wherein the instructions further include instructions to adjust a length of the first time segment or the second time segment based on a determination that there is not contrast in the compensated frame.

9. The system of claim 1, wherein the first time segment and the second time segment are calibrated prior to capturing the first frame to provide contrast in the compensated frame.

10. The system of claim 1, wherein the first illumination intensity and the second illumination intensity are calibrated prior to capturing the first frame to provide contrast in the compensated frame.

11. The system of claim 1, wherein the first time segment is no more than 25 milliseconds.

12. The system of claim 1, wherein the second time segment is no more than 8 milliseconds.

13. A method, comprising:
   capturing a first frame of image data at a first illumination intensity during a first time segment;
   capturing a second frame at a second illumination intensity during a second time segment after the first time segment;
   combining the first frame and the second frame to output a compensated frame; and
   estimating an amount of ambient light by dividing the first time segment by the second time segment and multiplying by the second illumination intensity.

14. The method of claim 13, further comprising decreasing the first illumination intensity and then capturing a third frame during the first time segment.

15. The method of claim 14, further comprising combining and outputting the third frame and the second frame as a second compensated frame.

16. The method of claim 13, wherein the second illumination intensity is no illumination.

17. The method of claim 13, wherein the first time segment and the second time segment are calibrated prior to capturing the first frame to provide contrast in the compensated frame.

18. A system, comprising a computer that includes a processor and a memory, the memory storing instructions executable by the processor including instructions to:
 capture a first frame of image data at a first illumination intensity during a first time segment;
 capture a second frame at a second illumination intensity during a second time segment after the first time segment;
 combine the first frame and the second frame to output a compensated frame; and
 determine whether there is contrast in the compensated frame based on an illumination intensity threshold, contrast being measured between a plurality of pixels of the compensated frame.

19. The system of claim 18, wherein contrast is measured as the difference in luminance between a plurality of white pixels and a plurality of black pixels of the compensated frame.

* * * * *